United States Patent
Yamagishi

(10) Patent No.: US 8,633,272 B2
(45) Date of Patent: Jan. 21, 2014

(54) RUBBER COMPOSITION AND PNEUMATIC TIRE PRODUCED USING SAME

(75) Inventor: Yasushi Yamagishi, Tokyo (JP)

(73) Assignee: Bridgestone Corporation, Tokyo (JP)

( * ) Notice: Subject to any disclaimer, the term of this patent is extended or adjusted under 35 U.S.C. 154(b) by 43 days.

(21) Appl. No.: 13/122,100

(22) PCT Filed: Sep. 30, 2009

(86) PCT No.: PCT/JP2009/067013
§ 371 (c)(1),
(2), (4) Date: May 12, 2011

(87) PCT Pub. No.: WO2010/038768
PCT Pub. Date: Apr. 8, 2010

(65) Prior Publication Data
US 2011/0224364 A1    Sep. 15, 2011

(30) Foreign Application Priority Data

Oct. 1, 2008 (JP) ................................. 2008-256369

(51) Int. Cl.
*C08K 3/04* (2006.01)
*C08L 9/00* (2006.01)

(52) U.S. Cl.
USPC .......................................... 524/495; 524/571

(58) Field of Classification Search
USPC ................................................ 524/495, 571
See application file for complete search history.

(56) References Cited

U.S. PATENT DOCUMENTS

| | | | |
|---|---|---|---|
| 5,674,798 A | 10/1997 | Kitamura et al. | |
| 6,645,287 B2 | 11/2003 | Nguyen et al. | |
| 2007/0197715 A1* | 8/2007 | Yanagioka | 524/495 |
| 2010/0179274 A1 | 7/2010 | Jinbo et al. | |

FOREIGN PATENT DOCUMENTS

| | | |
|---|---|---|
| CN | 101268136 | 9/2008 |
| EP | 0709408 A1 | 5/1996 |
| JP | 6-094519 B1 | 11/1994 |
| JP | 2004-527625 A | 9/2004 |
| JP | 2005-272729 A | 10/2005 |
| JP | 2005-272734 A | 10/2005 |
| WO | 2005/092970 A1 | 10/2005 |

* cited by examiner

*Primary Examiner* — Ling Choi
*Assistant Examiner* — Ronald Grinsted
(74) *Attorney, Agent, or Firm* — Sughrue Mion, PLLC

(57) ABSTRACT

The present invention relates to a rubber composition containing carbon black for blending with rubber which is obtained in a reaction equipment comprising a combustion gas-generating zone, a reaction zone and a reaction-stopping zone by producing a high temperature combustion gas in the combustion gas-generating zone, subsequently spraying and introducing a raw material into the reaction zone to form a reaction gas stream containing carbon black and then quenching the above reaction gas stream by a multistage quenching medium-introducing means to terminate the reaction, wherein (1) the above carbon black for blending with rubber satisfies the following relational equations (1) and (2):

$$10 < X < 40 \qquad (1)$$

$$90 < Z < 100 \qquad (2)$$

(wherein X represents a toluene extract light transmittance (%) of the carbon black after introducing a first quenching medium from a raw material-introducing position, and Z represents a toluene extract light transmittance (%) of the carbon black after introducing a final quenching medium) and (2) (B) the above carbon black for blending with rubber is contained in a proportion of 10 to 250 parts by mass based on 100 parts by mass of (A) a rubber component containing a conjugated diene based rubber. The present invention provides a carbon black-containing rubber component providing a pneumatic tire in which a rolling resistance and an abrasion resistance are balanced at a high level.

4 Claims, 1 Drawing Sheet

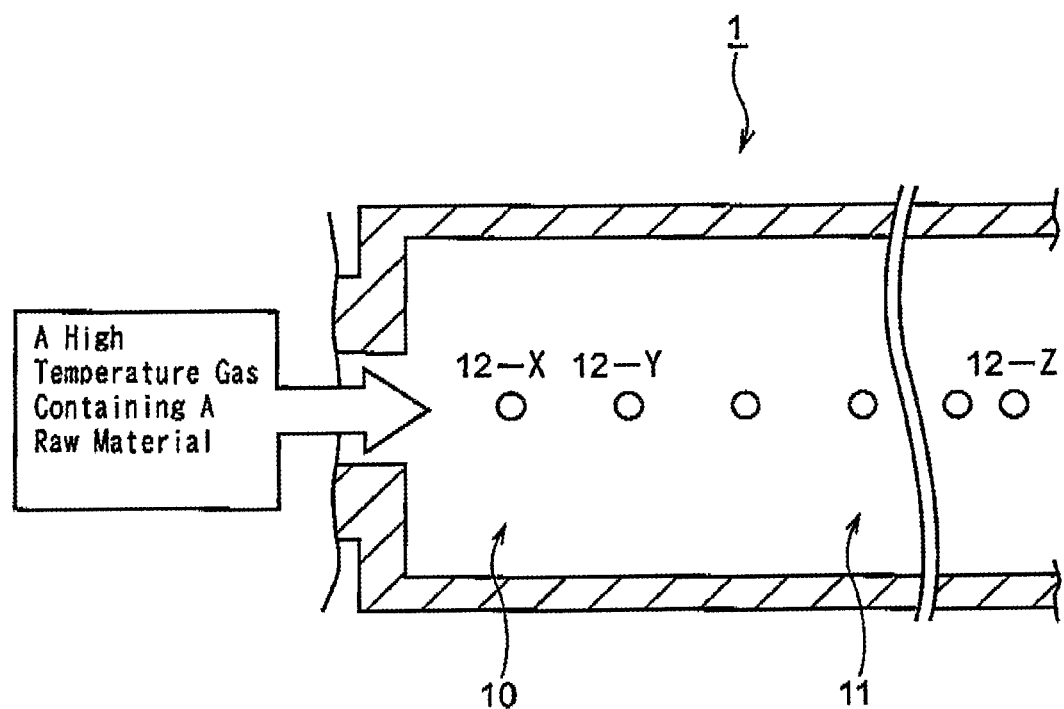

RUBBER COMPOSITION AND PNEUMATIC TIRE PRODUCED USING SAME

CROSS REFERENCE TO RELATED APPLICATIONS

This application is a National Stage of International Application No. PCT/JP2009/067013 filed Sep. 30, 2009, which claims priority to Japanese Patent Application No. 2008-256369 filed Oct. 1, 2008, the contents of all of which are incorporated herein by reference in their entirety.

BACKGROUND OF THE INVENTION

The present invention relates to a rubber composition and a pneumatic tire prepared by using the same. More specifically, the present invention relates to a rubber composition containing specific carbon black which provides a pneumatic tire having an excellent balance between a rolling resistance and an abrasion resistance and a pneumatic tire containing the same.

RELATED ART

Carbon black is an industrially useful raw material produced by spraying raw material hydrocarbon into a high temperature combustion gas which is generated in a furnace oven under strictly controlled conditions or which is generated outside and introduced into an oven and thermally cracking or incompletely burning the above raw material hydrocarbon. Carbon black has the peculiar property that it can dramatically enhance characteristics such as a mechanical property, particularly a tensile strength and an abrasion resistance of a composition in blending rubber, and therefore it is widely used as a filling reinforcing material for various rubber products including tires.

Carbon black for blending with rubber exerts a large influence on the performances of a blend rubber composition according to physicochemical characteristics thereof, that is, a diameter of a unit particle constituting the carbon black, a surface area (specific surface area) per unit mass, a connecting manner (structure) of the particles, surface properties and the like, and therefore carbon blacks having various different characteristics are selectively used according to the required rubber performances, the environment used and the like.

An excellent resistance property (abrasion resistance) against abrasion caused by contact with roads while rotating at a high speed as well as a reduction (low heat generation property) in a hysteresis loss characteristic brought about by repetitive deformation of a rubber composition which is caused by contact with a road surface are important factors in a rubber composition used for a ground contact surface of a tire, and it is known that the above two characteristics provide an antinomic phenomenon.

When employing means for enhancing an abrasion resistance by using carbon black for blending to a tire tread, for example, carbon black having a larger specific surface area or a structure, an abrasion resistance and a low heat generation property are characteristics which are antithetical to each other as described above, and carbon blacks having various characteristics are proposed in order to solve the above problem.

In carbon black, increasing a contact area with the polymer by increasing the specific surface area (CTAB (cetyltrimethylammonium bromide) $m^2/g$) and increasing interaction with the polymer by increasing the DBP absorption number have so far been carried out as means for enhancing the abrasion resistance. On the other hand, it is carried out as means for reducing the rolling resistance to reduce the contact area with the polymer by decreasing the specific surface area and reduce the DBP (dibutyl phthalate) absorption number.

As can be found from the above, it is difficult to achieve an increase in the abrasion resistance and a reduction in the rolling resistance as the carbon black characteristics at the same time.

Consequently, carbon black for blending to a tire tread having the characteristics of (1) a DBP absorption number (DBP) of 40 to 250 ml/100 g, (2) a DBP absorption number (24M4DBP) of 35 to 220 ml/100 g after compression operation, (3) a CTAB adsorption specific surface area (CTAB) of 70 to 200 $m^2/g$, (4) a hydrogen discharge rate (%) of $>0.260-0.000625\times(CTAB)$ and (5) a toluene extract light transmittance of 90% or more is disclosed as carbon black satisfying an excellent abrasion resistance and an excellent hysteresis characteristic (low heat generation property) at the same time (refer to, for example, a patent document 1).

On the other hand, in association with a global trend of controlling emission of carbon dioxide which is involved in growing interest in recent environmental problems, requirements to a reduction in fuel consumption of automobiles are growing. A rolling resistance in the performances of tires is required to be reduced in order to meet the above requirements. A method of optimizing a tire structure has so far been investigated as a method for reducing a rolling resistance of tires, and it is carried out as the most usual method at present to use a rubber composition having a lower heat generation property as a rubber composition applied to tires.

Rubber compositions prepared by using a modified conjugated diene based polymer having an amino group introduced into a polymerization active end as a rubber component and using carbon black as a filler in order to reduce a rolling resistance are proposed in patent documents 2 and 3.

Patent document 1: Japanese Patent Application Laid-Open No. 272734/2005
Patent document 2: Japanese Patent Application Laid-Open No. 225604/1996
Patent document 3: Japanese Patent Application Laid-Open No. 231658/1996

DISCLOSURE OF THE INVENTION

In general, a particle diameter and a structure of carbon black blended with a rubber composition constituting a tire are considered to be controlling factors for enhancing an abrasion resistance of the tire, and the more the particle diameter of carbon black is reduced, the more the abrasion resistance thereof is enhanced. However, it is known that if a particle diameter of carbon black is extremely small, inferior dispersion thereof is brought about in the rubber to increase the heat generation property. When a tire tread is produced from the above rubber composition, it is excellent in an abrasion resistance but inferior in a low fuel consumption. That is, an abrasion resistance and a low fuel consumption stay in an antinomic relation in a particle diameter of carbon black. Also, the more the structure is increased, the more the abrasion resistance tends to be enhanced, but if the structure is increased too much, involved therein are the problems that the processability and the chipping resistance are reduced and that the heat generation property grows larger. Further, the abrasion resistance grows larger to some extent by increasing a blend amount of carbon black, but the same concern (reduction in the processability) as in a case of increasing the structure is brought about.

The present invention has been made under the above situations, and an object of the present invention is to provide a carbon black-containing rubber composition providing a pneumatic tire in which a rolling resistance and an abrasion resistance are balanced at a high level and a pneumatic tire containing the same.

Intensive researches repeated by the present inventors in order to achieve the object described above have resulted in finding that the object can be achieved by a rubber composition containing carbon black which is obtained by a specific process and which has specific properties. The present invention has been completed based on the above knowledge.

That is, the present invention provides:

[1] A rubber composition containing carbon black for blending with rubber which is obtained in a reaction equipment continuously provided with a combustion gas-generating zone, a reaction zone and a reaction-stopping zone by producing a high temperature combustion gas in the combustion gas-generating zone, subsequently spraying and introducing a raw material into the reaction zone to form a reaction gas stream containing carbon black and then quenching the above reaction gas stream by a multistage quenching medium-introducing means in the reaction-stopping zone to terminate the reaction,
wherein
(1) the above carbon black for blending with rubber satisfies the following relational equations (1) and (2):

$$10 < X < 40 \tag{1}$$

$$90 < Z < 100 \tag{2}$$

(wherein X represents a toluene extract light transmittance (%) of the carbon black after introducing a first quenching medium from a raw material-introducing position, and Z represents a toluene extract light transmittance (%) of the carbon black after introducing a final quenching medium) and
(2) (B) the above carbon black for blending with rubber is contained in a proportion of 10 to 250 parts by mass based on 100 parts by mass of (A) a rubber component containing a conjugated diene based rubber,

[2] the rubber composition according to claim 1, wherein the carbon black for blending with rubber is obtained by controlling the following factors so that the following relational equations (3), (4) and (5) are satisfied:

$$2.00 \le \alpha 1 \le 5.00 \tag{3}$$

$$5.00 \le \alpha 2 \le 9.00 \tag{4}$$

$$-2.5 \times (\alpha 1 + \alpha 2) + 85.0 \le \beta \le 90.0 \tag{5}$$

(wherein a retention time spent in the reaction zone until the first quenching medium is introduced since the raw material is sprayed and introduced into the reaction zone is $t_1$ (second) and that an average reaction temperature in the above zone is $T_1$ (° C.); a retention time spent in the zone until a second quenching medium is introduced since the first quenching medium is introduced is $t_2$ (second) and that an average reaction temperature in the above zone is $T_2$ (° C.); a retention time spent in the zone until the final quenching medium is introduced since the second quenching medium is introduced is $t_3$ (second) and that an average reaction temperature in the above zone is $T_3$ (° C.); $\alpha 1$ is $t_1 \times R_1$; $\alpha 2$ is $t_2 \times T_2$; and $\beta$ is $t_3 \times T_3$),

[3] the rubber composition according to the above item [1] or [2], wherein the carbon black for blending with rubber is obtained by controlling the factors so that the following relational equations (6), (7) and (8) are satisfied:

$$20 < X < 40 \tag{6}$$

$$50 < Y < 60 \tag{7}$$

$$90 < Z < 95 \tag{8}$$

(wherein Y represents a toluene extract light transmittance of the carbon black after introducing the second quenching medium, and X and Z are the same as described above),

[4] the rubber composition according to any of the above items [1] to [3], wherein a hydrogen discharge rate of the carbon black for blending with rubber is higher than 0.30% by mass,

[5] the rubber composition according to any of the above items [1] to [4], wherein the carbon black for blending with rubber has a DBP absorption number of 95 to 220 ml/100 g, a 24M4DBP absorption number of 90 to 200 ml/100 g and a CTAB adsorption specific surface area of 70 to 200 m²/g,

[6] the rubber composition according to any of the above items [1] to [5], wherein (A) the rubber component contains a modified conjugated diene based polymer obtained by modifying at least one molecular end thereof by a modifier comprising a compound containing a functional group having an interaction with the carbon black,

[7] the rubber composition according to the above item [6], wherein the modifier is at least one selected from a tin compound, an amine compound and a silicon compound,

[8] the rubber composition according to the above item [6] or [7], wherein the modified conjugated diene based polymer is contained in a proportion of 10% by mass or more based on a whole amount of (A) the rubber component,

[9] the rubber composition according to any of the above items [6] to [8], wherein the modified conjugated diene based polymer is obtained by reacting the modifier with an active end of a conjugated diene based polymer prepared by polymerization using an organic alkali metal compound or a rare earth metal compound and

[10] a pneumatic tire prepared by using the rubber composition according to any of the above items [1] to [9].

The rubber composition of the present invention provides the following effects by containing the carbon black which is obtained by the specific process and which has the specific properties in a prescribed proportion.

(1) When carbon black is blended with a rubber composition, it is usually difficult to provide the above rubber composition with both of an excellent abrasion resistance and a low heat generation property, but use of the carbon black according to the present invention makes it possible to provide a rubber composition in which an abrasion resistance is balanced with a low heat generation property (low rolling resistance) at a high level.

(2) The carbon black described above which is provided with a hydrogen discharge rate of higher than 0.30% by mass and a DBP absorption number, a 24M4DBP absorption number and a CTAB adsorption specific surface area each falling in the specific ranges is particularly suited in terms of the effect described above.

(3) The rubber component of the rubber composition contains a substance obtained by modifying at least one molecular end thereof by a modifier having a functional group having an interaction with carbon black, whereby the effect described above is exerted better.

(4) A pneumatic tire obtained by using the rubber composition of the present invention is excellent in an abrasion resistance and excellent as well in a rolling resistance.

BRIEF EXPLANATION OF THE DRAWING

FIG. 1 is a partial longitudinal front explanatory drawing of one example of a carbon black production furnace for producing the carbon black for blending with rubber.

EXPLANATIONS OF THE CODES

1 Carbon black production furnace
10 Reaction chamber
11 Reaction continuing-cum-cooling chamber
12 Multistage quenching medium-introducing means
12-X First quenching medium-introducing means
12-Y Second quenching medium-introducing means
12-Z Final quenching medium-introducing means

BEST MODE FOR CARRYING OUT THE INVENTION

First, the rubber composition of the present invention shall be explained.

The rubber composition of the present invention contains carbon black for blending with rubber which is obtained in a reaction equipment continuously provided with a combustion gas-generating zone, a reaction zone and a reaction-stopping zone by producing a high temperature combustion gas in the combustion gas-generating zone, subsequently spraying and introducing a raw material into the reaction zone to form a reaction gas stream containing carbon black and then quenching the above reaction gas stream by a multistage quenching medium-introducing means to terminate the reaction.

Production Process of Carbon Black for Blending with Rubber:

A production process of the carbon black for blending with rubber which is used for the rubber composition of the present invention shall be explained.

An inside of the carbon black production furnace is of a structure in which a combustion zone, a reaction zone and a reaction-stopping zone are continuously provided, and a whole part thereof is covered with a refractory.

The carbon black production furnace is equipped with a combustible fluid-introducing chamber as the combustion zone, a cylinder for introducing an oxygen-containing gas in which an oxygen-containing gas introduced from an outer circumference of a furnace head part through an oxygen-containing gas-introducing tube is straightened by means of a current plate and introduced into the combustible fluid-introducing chamber and a fuel oil-spraying device introducing tube which is installed in a central axis of the cylinder for introducing an oxygen-containing gas and which introduces hydrocarbon for a fuel into the combustible fluid-introducing chamber. A high temperature combustion gas is produced in the combustion zone by combustion of the hydrocarbon for a fuel.

The carbon black production furnace is equipped with a converging chamber as the reaction zone in which the cylinder converges gradually, a raw material oil-introducing chamber having, for example, four fuel oil-spraying ports at a downstream side of the converging chamber and a reaction chamber at a downstream side of the fuel oil-introducing chamber. A raw material hydrocarbon is sprayed and introduced through the fuel oil-spraying ports into a high temperature combustion gas stream coming from the combustion zone. The raw material hydrocarbon is sprayed and introduced into the high temperature combustion gas stream in the reaction zone to convert the raw material hydrocarbon into carbon black by incomplete combustion or thermal cracking reaction.

FIG. 1 is a partial longitudinal front explanatory drawing of one example of the above carbon black production furnace for producing the above carbon black for blending with rubber, and it shows a reaction chamber 10 into which a high temperature gas containing a raw material (raw material hydrocarbon) for carbon black is introduced and a reaction continuing-cum-cooling chamber 11. As shown in FIG. 1, the carbon black production furnace 1 is equipped with the reaction continuing-cum-cooling chamber 11 having a multistage quenching medium-introducing means 12 as the reaction-stopping zone. The multistage quenching medium-introducing means 12 sprays a quenching medium such as water and the kike onto the high temperature combustion gas stream coming from the combustion zone. The high temperature combustion gas stream is quenched by the quenching medium in the reaction-stopping zone to terminate the reaction.

Further, the carbon black production furnace 1 may be equipped with a device for introducing a gaseous substance in the reaction zone or the reaction-stopping zone. In this connection, a mixture of air, oxygen and hydrocarbon, a combustion gas obtained by combustion reaction thereof and the like can be used as the "gaseous substance".

Thus, an average reaction temperature and a retention time in the respective zones through which the reaction gas stream passes until it goes into the reaction-stopping zone are controlled in production of the carbon black to set the toluene extract light transmittances X, Y and Z to the desired values, whereby the carbon black for blending with rubber which is used for the rubber composition of the present invention is obtained.

In this regard, the respective zones in the present invention shall be explained.

The combustion zone is a region in which a high temperature gas stream is produced by reaction of a fuel and air, and a downstream end thereof shows a point in which the raw material oil is introduced into the reaction equipment (when introduced in the plural positions, an uppermost stream side), for example, an upper stream side (left side in FIG. 1) than a point in which the raw material oil is introduced.

Further, the reaction zone shows a zone from a point in which the raw material hydrocarbon is introduced (when introduced in the plural positions, an uppermost stream side) up to a point in which the multistage quenching water-spraying means 12 (these means are freely taken out and put in in the reaction continuing-cum-cooling chamber 11, and use positions thereof are selected according to the kind of the products produced and the characteristics thereof) in the reaction continuing-cum-cooling chamber 11 work (introducing a refrigerant such as water and the like). That is, in a case where the raw material oil is introduced, for example, in the third raw material oil-spraying port and where water is introduced in the multistage quenching medium-introducing means 12, a region between them is the reaction zone. The reaction-stopping zone shows a zone present at a lower side (right side in FIG. 1) than the point in which the quenching water-pressing and spraying means is allowed to work.

The term of the reaction continuing-cum-cooling chamber 11 is used in FIG. 1 because of the following reasons; a zone from the point in which the raw material is introduced up to the point in which the quenching water-pressing and spraying means for stopping the reaction works is the reaction zone, and a zone following it is the reaction-stopping zone; and the above quenching water-introducing position moves in a certain case according to performances required to the carbon black.

Properties of the Carbon Black for Blending with Rubber:

In the present invention, the carbon black for blending with rubber obtained in the manner described above has to satisfy the following relational equations (1) and (2):

$$10<X<40 \tag{1}$$

$$90<Z<100 \tag{2}$$

X described above represents a toluene extract light transmittance (%) of the carbon black after introducing the quenching medium from the raw material-introducing position by the first quenching medium-introducing means (12-X in FIG. 1), and Z described above represents a toluene extract light transmittance (%) of the carbon black after introducing the quenching medium by the final quenching medium-introducing means (12-Z in FIG. 1). That is, a toluene extract light transmittance of the carbon black after introducing the first quenching medium has to fall in a range of higher than 10% and less than 40%, and a toluene extract light transmittance of the carbon black (carbon black for blending with rubber) after introducing the final quenching medium has to fall in a range of higher than 90% and less than 100%. If a toluene extract light transmittance of the above carbon black for blending with rubber is 90% or less, a heavy tar component contained in the above carbon black is present in a large amount, and the carbon black can not provide the rubber with a sufficiently high reinforcing property, and an abrasion resistance thereof is reduced.

Also, if X described above is 40% or more, the carbon black is reduced in a reinforcing property to lower an abrasion resistance thereof.

The carbon black for blending with rubber having the above properties can be obtained by controlling the reaction temperature and the retention time in the following manner.

That is, when a retention time spent in the reaction zone until the first quenching medium is introduced since the raw material is sprayed and introduced into the reaction zone is set to $t_1$ (second) and that an average reaction temperature in the above zone is set to $T_1$ (° C.), when a retention time spent in the zone until the quenching medium is introduced by the second quenching medium-introducing means (12-Y in FIG. 1) since the first quenching medium is introduced is set to $t_2$ (second) and that an average reaction temperature in the above zone is set to $T_2$ (° C.) and when a retention time spent in the zone until the final quenching medium is introduced since the second quenching medium is introduced (that is, a retention time spent in the zone until the quenching medium passes through the reaction-stopping zone) is set to $t_3$ (second) and that an average reaction temperature in the above zone is set to $T_3$ (° C.), the above carbon black for blending with rubber can be obtained by controlling the above factors so that the following relational equations (3), (4) and (5) are satisfied:

$$2.00 \leq \alpha 1 \leq 5.00 \tag{3}$$

$$5.00 \leq \alpha 2 \leq 9.00 \tag{4}$$

$$-2.5 \times (\alpha 1 + \alpha 2) + 85.0 \leq \beta \leq 90.0 \tag{5}$$

(wherein $\alpha 1$ is $t_1 \times T_1$; $\alpha 2$ is $t_2 \times T_2$; and $\beta$ is $t_3 \times T_3$), The carbon black production furnace 1 assumes a structure in which thermocouples can be inserted into the furnace at optional several spots in order to monitor a temperature of the furnace. The temperatures are preferably measured at least at 2 spots, desirably 3 to 4 spots in the respective steps (respective zones) in order to calculate the average reaction temperatures $T_1$, $T_2$ and $T_3$.

Further, the retention times $t_1$, $t_2$ and $t_3$ shall be calculated according to the following equations by calculating a volume of the introduced reaction gas fluid according to a publicly known thermodynamic calculating method. Incidentally, an increase in the volume brought about by the cracking reaction of the raw material oil and the quenching medium shall be neglected.

Retention time $t_1$ (second)=(capacity ($m^3$) passing in the furnace from the raw material hydrocarbon-introducing position up to the first quenching medium-introducing position)/(volume (m$^3$/sec) of the reaction gas fluid)

Retention time $t_2$ (second)=(capacity ($m^3$) passing in the furnace from the first quenching medium-introducing position up to the second quenching medium-introducing position)/(volume (m$^3$/sec) of the reaction gas fluid)

Retention time $t_3$ (second)=(capacity ($m^3$) passing in the furnace from the second quenching medium-introducing position up to the final quenching medium-introducing position)/(volume (m$^3$/sec) of the reaction gas fluid)

Further, carbon black which is obtained by controlling the factors so that the following relational equations (6), (7) and (8) are satisfied can suitably be used as the above carbon black for blending with rubber:

$$20<X<40 \tag{6}$$

$$50<Y<60 \tag{7}$$

$$90<Z<95 \tag{8}$$

(wherein Y represents a toluene extract light transmittance of the carbon black after introducing the second quenching medium, and X and Z are the same as described above).

The toluene extract light transmittance described above is measured by a method described in an eighth item B method of JIS K6218: 1997 and shown by a percentage based on that of pure toluene.

The above carbon black for blending with rubber has preferably a hydrogen discharge rate exceeding 0.3% by mass. If the above hydrogen discharge rate exceeds 0.3% by mass, the rubber composition of the present invention is enhanced in an abrasion resistance and reduced in a heat generation property. The above hydrogen discharge rate is preferably 0.35% by mass or more. An upper limit thereof is usually about 0.4% by mass.

The hydrogen discharge rate described above is determined in the following manner:

(1) a carbon black sample is dried in an isothermal drier of 105° C. for one hour and then cooled down to room temperature in a desiccator, (2) about 10 mg of the sample is precisely weighed into a tubular sample vessel made of tin, pressed and tightly stoppered and (3) an amount of a hydrogen gas generated when heating the sample at 2000° C. for 15 minutes under argon flow is measured by means of a hydrogen analytical equipment (EMGA621W, manufactured by HORIBA, Ltd.) and shown by mass percentage.

Further, the above carbon black for blending with rubber has preferably a dibutyl phthalate absorption number (DBP) of 95 to 220 mL/100 g, a compression DBP absorption number (24 M4DBP) of 90 to 200 mL/100 g and a cetyltrimethylammonium bromide absorption specific surface area (CTAB) of 70 200 m²/g.

The dibutyl phthalate absorption number (DBP) and the compression DBP absorption number (24M4DBP) are measured by methods described in ASTM D2414-88 (JIS K6217-4: 2001) and shown by volume mL of dibutyl phthalate (DBP) absorbed in 100 g of carbon black. Also, the cetyltrimethylammonium bromide absorption specific surface area (CTAB) is measured by a method described in JIS K6217-3: 2001 and shown by a specific surface area m²/g per unit mass of carbon black.

Rubber Composition:

The rubber composition of the present invention has to contain (B) the carbon black for blending with rubber described above in a proportion of 10 to 250 parts by mass based on 100 parts by mass of (A) the rubber component containing a conjugated diene based rubber.

If a content of the carbon black described above is less than 10 parts by mass, a reinforcing effect of the rubber composition is not sufficiently exerted, and the desired abrasion resistance is not obtained. On the other hand, if it exceeds 250 parts by mass, the rubber composition having desired physical properties such as a low rolling resistance and the like is not obtained. A content of the carbon black of the component (B) described above is preferably 20 to 150 parts by mass, more preferably 30 to 120 parts by mass based on 100 parts by mass of (A) the rubber component.

Carbon black which is produced by the method described above and which has the physical properties described above is used as the carbon black for blending with rubber of the component (B) described above, and the form of the above carbon black includes FEF, SRF, HAF, ISAF, ISAF-LS, SAF-LS and the like.

(A) Rubber Component:

The conjugated diene based rubber contained in (A) the rubber component includes at least one selected from natural rubber, polybutadiene rubber, styrene-butadiene copolymer rubber, synthetic isoprene rubber, ethylene-propylene-diene rubber, chloroprene rubber and the like, and all of (A) the rubber component comprise preferably the conjugated diene based rubber.

In the present invention, a modified conjugated diene based polymer obtained by modifying at least one molecular end thereof by a modifier comprising a compound containing a functional group having an interaction with the carbon black is contained further preferably in (A) the rubber component from the viewpoint of a balance between an abrasion resistance and a low rolling resistance of the rubber composition obtained.

Modifier:

The modifier described above includes at least one selected from tin compounds, amine compounds and silicon compounds. The conjugated diene based polymer modified at at least one molecular end thereof by the above modifiers includes modified polybutadiene rubbers, modified styrene-butadiene copolymer rubbers and the like. The above modified conjugated diene based polymers is contained in (A) the rubber component described above in a proportion of preferably 10% by mass or more, more preferably 30% by mass or more based on a whole amount thereof from the viewpoint of a balance between an abrasion resistance and a low rolling resistance of the above rubber composition.

The tin compounds of the modifier described above include tin tetrachloride, dichlorodioctyltin, trioctyltin chloride, dibutyldichlorotin and the like. The amine compounds include N,N-diethylbenzaldehyde, bis(N,N-diethylamino) benzophenone and the like. The silicon compounds include N,N-bis(trimethylsilyl)aminopropylmethyldimethoxysilane, N,N-bis(trimethylsilyl)aminopropylmethyldiethoxysilane, N,N-bis(trimethylsilyl)aminoethylmethyldimethoxysilane, N,N-bis(trimethylsilyl)aminoethylmethyldiethoxysilane, 1-trimethylsilyl-2,2-diethoxymethyl-1-aza-2-silacyclopentane, triethoxysilylpropyldihydroimidazole, methylbutylidenetriethoxysilylpropylamine, 3-glycidoxypropyltrimethoxysilane, 3-glycidoxypropyltriethoxysilane, tetraethoxysilane and the like.

In the modification reaction by the modifiers described above, a use amount of the modifiers is preferably 0.5 to 200 mmol/kg•conjugated diene polymer or conjugated diene-aromatic vinyl copolymer. The above content is more preferably 1 to 100 mmol/kg•conjugated diene-aromatic vinyl copolymer or conjugated diene polymer, particularly preferably 2 to 50 mmol/kg•conjugated diene-aromatic vinyl copolymer or conjugated diene polymer. In this regard, the conjugated diene polymer or the conjugated diene-aromatic vinyl copolymer means a mass of only the polymer which does not contain additives such as an antioxidant and the like added in or after production. Controlling a use amount of the modifier to the ranges described above makes the filler excellent in a dispersibility and improves the mechanical characteristics, the abrasion resistance and the low fuel consumption after vulcanization.

Condensation Accelerator:

In the present invention, a condensation accelerator may be used in order to accelerate condensation reaction which an alkoxysilane compound used as the modifier described above participates in.

Capable of being used as the above condensation accelerator are compounds having a tertiary amino group or organic compounds containing at least one element belonging to any of the 3rd group, the 4th group, the 5th group, the 12th group, the 13th group, the 14th group and the 15th group in the periodic table (long-form). Further, the condensation accelerator is preferably alkoxides, carboxylates or acetylacetonate complex salts containing at least one metal selected from the group consisting of titanium (Ti), zirconium (Zr), bismuth (Bi), aluminum (Al) and tin (Sn).

The condensation accelerator used above can be added before the modification reaction described above, and it is added to the modification reaction system preferably in the middle of the modification reaction and/or after finishing the modification reaction. If it is added before the modification reaction, direct reaction with an active end is brought about, and a hydrocarbyloxy group having a primary amino group protected by the active end is not introduced in a certain case.

An addition timing of the condensation accelerator is usually 5 minutes to 5 hours after initiating the modification reaction, preferably 15 minutes to 1 hour after initiating the modification reaction.

Capable of being used as the modified conjugated diene based polymer described above are compounds obtained by reacting the modifiers described above with active ends of conjugated diene based polymers prepared by carrying out anionic polymerization using organic alkali metal compounds or active ends of conjugated diene based polymers prepared by carrying out coordinate polymerization using rare earth metal compounds.

<Anionic Polymerization>

Hydrocarbyllithium compounds, lithium amide compounds or first group metal alkoxides are preferably used as the organic alkali metal compounds. First group metals of the first group metal alkoxides include lithium, sodium, potassium, rubidium, cesium and the like. When the hydrocarbyllithium compounds are used as the polymerization initiator, conjugated diene based polymers which have a hydrocarbyl group at a polymerization initiation end and in which the other end is a polymerization active site are obtained. On the other hand, when the lithium amide compounds are used as the polymerization initiator, conjugated diene based polymers which have a nitrogen-containing functional group at a polymerization initiation end and in which the other end is a polymerization active site are obtained, and the above polymers can be used as the modified conjugated diene based polymer in the present invention without being modified by the modifier.

A method in which the conjugated diene based polymers having an active end are produced by anionic polymerization using the organic alkali metal compounds described above as the polymerization initiator shall not specifically be restricted, and a conjugated diene compound alone or a mixture of a conjugated diene compound and an organic vinyl compound is polymerized on publicly known conditions in a hydrocarbon solvent which is inactive to the polymerization reaction, whereby the conjugated diene based polymers having an active end can be produced. The above anionic polymerization may be carried out in the presence of a randomizer.

Preparation of Rubber Composition:

The rubber composition of the present invention can be blended with, in addition to (A) the rubber component containing a conjugated diene based rubber and (B) the carbon black for blending with rubber, other components, for example, blending agents usually used in the rubber industry, such as inorganic fillers, vulcanizing agents, vulcanization accelerators, zinc oxide, stearic acid, antioxidants and the like by suitably selecting them in a range in which the effects of the present invention are not damaged. Commercial products can suitably be used as the above blending agents. The rubber composition described above can be prepared by blending the respective blending agents suitably selected with (A) the rubber component and (B) the carbon black for blending with rubber, kneading the mixture by means of a Banbury mixer, a roll, an internal mixer, an intensive mixer and the like and then warming and extruding it.

Pneumatic Tire:

The pneumatic tire of the present invention is characterized by that the rubber composition described above is applied to any of tire members. In this connection, the rubber composition of the present invention is used particularly preferably for a tread in the tire of the present invention, and the tire in which the rubber composition described above is used for a tread is excellent in an abrasion resistance, low in a rolling resistance and excellent as well in a low fuel consumption. Gas filled in the tire of the present invention includes air which is usual or changed in an oxygen partial pressure or inert gases such as nitrogen and the like. When the rubber composition of the present invention is used for a tread, it is extruded and processed into, for example, a member for a tread, and the member is adhered on a tire and molded by a usual method in a tire molding machine, whereby a crude tire is molded. This crude tire is heated and pressed in a vulcanizing equipment to obtain a tire.

EXAMPLES

The present invention shall be explained below in further details with reference to examples, but the present invention shall by no means be restricted to the examples shown below.

An abrasion resistance and a rolling resistance of the tire were evaluated according to the following methods.

(1) Abrasion Resistance:

The tires for a test were mounted on a vehicle and run 40,000 km, and then a loss weight of the groove portion was measured and shown by an index, wherein an inverse number of a loss weight value of a tire prepared in Comparative Example 1 was set to 100. The larger the above value is, the more excellent the abrasion resistance is.

(2) Rolling Resistance:

A running resistance of the tire in freely rotating it on a drum was measured. The rolling resistance value obtained above was used to determine the rolling resistance index according to the following equation. The smaller the numerical value is, the better the rolling resistance is.

Rolling resistance index=(rolling resistance value of the tire for a test×100)/(rolling resistance value of the tire of Comparative Example 1)

Further, a toluene extract light transmittance, a hydrogen discharge rate, a DBP absorption number, a 24M4DBP absorption number and a CTAB adsorption specific surface area of the carbon black were measured according to the methods described in the present specification.

Production Example 1

Production of Carbon Black A

The carbon black production furnace shown in FIG. 1 was used to produce carbon black A, wherein a three stage quenching medium-introducing means comprising a first quenching medium-introducing means 12-X, a second quenching medium-introducing means 12-Y and a final quenching medium-introducing means 12-Z was used as a multistage quenching medium-introducing means 12 in FIG. 1.

Also, used was the carbon black production furnace described above assuming a structure in which thermocouples could be inserted into the furnace at optional several spots in order to monitor a temperature of the furnace. In the carbon black production furnace, an A heavy oil having a specific density of 0.8622 (15° C./4° C.) was used for a fuel, and a heavy oil having properties shown in Table 1 was used for raw material oil. Operating conditions of the carbon black production furnace and characteristics of carbon black are shown in Table 3.

TABLE 1

| Specific gravity (JIS K2249) (15/4° C.) | | 1.1319 |
|---|---|---|
| Heavy viscosity (JIS K2283) (mm$^2$/s at 50° C.) | | 26.7 |
| Moisture content (JIS K2275) (%) | | 0.5 |
| Residual carbon (JIS K2210) (%) | | 11.6 |
| Sulfur content (JIS K2213) (%) | | 0.4 |
| Carbon content (%) | | 90.1 |
| Hydrogen content (%) | | 5.4 |
| BMCI*[1] | | 160 |
| Distillation characteristics (° C.) | I.B.P.*[2] | 188 |
| | 10% distillation point | 234 |
| | 30% distillation point | 291 |
| | 50% distillation point | 360 |

*[1]BMCI: Bureau of Mines Correlation Index (U.S. Bureau of Mines index)
*[2]I.B.P.: initial boiling point Production Examples 2 to 11

Production of Carbon Blacks B to K

Carbon blacks B to K were produced in the same manner as in Production Example 1, except that operating conditions shown in Table 3 were employed. The characteristics of the respective carbon blacks are shown in Table 3.

Production Example 12

Production of Modified Polybutadiene Rubber

A pressure-proof glass vessel having a content volume of about 900 ml which was dried and substituted with nitrogen was charged with 283 g of cyclohexane, 100 g of a 1,3-butadiene monomer and 0.015 mmol of 2,2-ditetrahydrofurylpropane in the form of a cyclohexane solution, and 0.50 mmol of n-butyllithium (BuLi) was added thereto, followed by carrying out polymerization for 4.5 hours in a warm water bath of 50° C. which was equipped with a stirring device. The conversion rate was almost 100%. N,N-bis(trimethylsilyl)-aminopropylmethyldiethoxysilane 0.50 mmol was added to the above polymerization system in the form of a cyclohexane solution, and the mixture was stirred at 50° C. for 30 minutes. Thereafter, 0.5 ml of an isopropanol 5 mass % solution of 2,6-di-tert-butyl-p-cresol (BHT) was further added to terminate the reaction, and the solution was dried according to an ordinary method to thereby obtain a modified polybutadiene rubber. The modified polybutadiene rubber thus obtained had a vinyl bond content of 20%. Also, a polybutadiene rubber before modified had a weight average molecular weight (Mw) of 300,000 in terms of polystyrene, which was measured by GPC.

Examples 1 to 10 and Comparative Examples 1 to 4

In Examples 1 to 5, 7 and 8 and Comparative Examples 1 to 4, the respective carbon blacks A to K shown in Table 3 were used to prepare 11 kinds of rubber compositions blended with the rubber composition 1 shown in Table 2 by means of a Banbury mixer.

Further, in Example 6, the carbon black E shown in Table 3 was used to prepare a rubber composition blended with the rubber composition 2 (the modified polybutadiene rubber was used) shown in Table 2 by means of the Banbury mixer.

In Example 9, the carbon black A shown in Table 3 was used to prepare a rubber composition blended with the rubber composition 3 shown in Table 2 by means of the Banbury mixer.

In Example 10, the carbon black A shown in Table 3 was used to prepare a rubber composition blended with the rubber composition 4 shown in Table 2 by means of the Banbury mixer.

Next, 14 kinds of tires for trucks having a tire size of 11R22.5 in which 14 kinds of the above rubber compositions were used for treads were prepared to evaluate rolling resistances and abrasion resistances thereof. The results thereof are shown in Table 3.

TABLE 2

| | | Rubber composition | | | |
|---|---|---|---|---|---|
| | | 1 | 2 | 3 | 4 |
| Composition (parts by mass) | Natural rubber[1] | 70 | 70 | 70 | 70 |
| | Polybutadiene rubber[2] | 30 | — | 30 | 30 |
| | Modified polybutadiene rubber[3] | — | 30 | — | — |
| | Carbon black[4] | 50 | 50 | 40 | 60 |
| | Stearic acid | 3 | 3 | 3 | 3 |
| | Antioxidant 6C[5] | 1 | 1 | 1 | 1 |
| | Zinc oxide | 5 | 5 | 5 | 5 |
| | Vulcanization accelerator CZ[6] | 1 | 1 | 1 | 1 |
| | Sulfur | 1.5 | 1.5 | 1.5 | 1.5 |

Remarks:
[1]Natural rubber: RSS #1
[2]Polybutadiene rubber: trade name "UBEPOL-BR150L", manufactured by Ube Industries, Ltd.
[3]Modified polybutadiene rubber: modified polybutadiene rubber obtained in Production Example 12
[4]Carbon black: carbon blacks obtained in Production Examples 1 to 11
[5]Antioxidant 6C: N-(1,3-dimethylbutyl)-N'-phenyl-p-phenylenediamine, trade name "Nocrac 6C", manufactured by Ouchi Shinko Chemical Industrial Co., Ltd.
[6]Vulcanization accelerator CZ: N-cyclohexyl-2-benzothiazylsulfenamide, trade name "Nocceler CZ", manufactured by Ouchi Shinko Chemical Industrial Co., Ltd.

TABLE 3

| | Example | | | | | | | | | | Comparative Example | | | |
|---|---|---|---|---|---|---|---|---|---|---|---|---|---|---|
| | 1 | 2 | 3 | 4 | 5 | 6 | 7 | 8 | 9 | 10 | 1 | 2 | 3 | 4 |
| Carbon black kind | A | B | C | D | E | E | F | G | A | A | H | I | J | K |
| Production Example No. | 1 | 2 | 3 | 4 | 5 | 5 | 6 | 7 | 1 | 1 | 6 | 7 | 8 | 9 |
| Raw material oil introducing conditions: Introducing amount (kg/hr) | 218 | 211 | 212 | 216 | 218 | 218 | 220 | 208 | 218 | 218 | 216 | 212 | 214 | 220 |
| Preheating temperature (°C.) | 213 | 221 | 220 | 218 | 219 | 219 | 220 | 223 | 213 | 213 | 219 | 221 | 220 | 218 |
| Air introducing conditions: Total introducing air amount (kg/hr) | 1021 | 1046 | 1157 | 1261 | 1352 | 1352 | 1150 | 980 | 1021 | 1021 | 1042 | 1124 | 1188 | 1386 |
| Preheating temperature (°C.) | 612 | 623 | 606 | 618 | 621 | 621 | 625 | 622 | 612 | 612 | 623 | 606 | 615 | 618 |
| Fuel introducing amount (kg/hr) | 50 | 50 | 55 | 60 | 66 | 66 | 50 | 48 | 50 | 50 | 50 | 54 | 58 | 67 |
| Retention time $t_1$ (sec) | 0.0028 | 0.0026 | 0.0023 | 0.0022 | 0.0021 | 0.0021 | 0.0017 | 0.0020 | 0.0028 | 0.0028 | 0.0034 | 0.0028 | 0.0018 | 0.0016 |
| Retention time $t_2$ (sec) | 0.0056 | 0.0053 | 0.0057 | 0.0050 | 0.0048 | 0.0048 | 0.0061 | 0.0059 | 0.0056 | 0.0056 | 0.0064 | 0.0066 | 0.0045 | 0.0046 |
| Retention time $t_3$ (sec) | 0.073 | 0.078 | 0.070 | 0.066 | 0.060 | 0.060 | 0.075 | 0.068 | 0.073 | 0.073 | 0.078 | 0.071 | 0.072 | 0.060 |
| Average reaction temperature $T_1$ (°C.) | 1486 | 1521 | 1574 | 1586 | 1586 | 1586 | 1479 | 1492 | 1486 | 1486 | 1526 | 1563 | 1574 | 1596 |
| Average reaction temperature $T_2$ (°C.) | 1238 | 1319 | 1153 | 1256 | 1232 | 1232 | 1230 | 1245 | 1238 | 1238 | 1319 | 1296 | 1169 | 1219 |
| Average reaction temperature $T_3$ (°C.) | 1177 | 1076 | 1078 | 1103 | 1089 | 1089 | 1170 | 1190 | 1177 | 1177 | 1071 | 1056 | 1069 | 1012 |
| $\alpha 1 = t_1 \times T_1$ (sec·°C.) | 4.16 | 3.95 | 3.62 | 3.49 | 3.33 | 3.33 | 2.51 | 2.98 | 4.16 | 4.16 | 5.19 | 4.38 | 2.83 | 2.55 |
| $\alpha 2 = t_2 \times T_2$ (sec·°C.) | 6.93 | 6.99 | 6.57 | 6.28 | 5.91 | 5.91 | 7.50 | 7.34 | 6.93 | 6.93 | 8.44 | 8.55 | 5.26 | 5.61 |
| $\beta = t_3 \times T_3$ (sec·°C.) | 85.92 | 83.93 | 75.46 | 72.80 | 65.34 | 65.34 | 87.75 | 80.92 | 85.92 | 85.92 | 83.54 | 74.98 | 76.97 | 60.72 |
| X (toluene extract light transmittance, %) | 29.1 | 30.5 | 31.7 | 31.8 | 32.6 | 32.6 | 23.5 | 25.6 | 29.1 | 29.1 | 35.6 | 33.1 | 23.0 | 23.4 |
| Y (toluene extract light transmittance, %) | 51.6 | 56.1 | 59.3 | 59.0 | 59.7 | 59.7 | 50.9 | 51.2 | 51.6 | 51.6 | 59.6 | 65.4 | 46.6 | 54.1 |
| Z (toluene extract light transmittance, %) | 90.9 | 92.3 | 94.3 | 94.6 | 91.5 | 91.5 | 90.3 | 91.3 | 90.9 | 90.9 | 81.9 | 81.0 | 89.3 | 79.5 |
| Characteristics of carbon black: Hydrogen discharge rate (% by mass) | 0.34 | 0.31 | 0.35 | 0.32 | 0.33 | 0.33 | 0.37 | 0.35 | 0.34 | 0.34 | 0.16 | 0.15 | 0.26 | 0.28 |
| DBP absorption number (ml/100 g) | 160 | 165 | 170 | 175 | 181 | 181 | 158 | 163 | 160 | 160 | 156 | 172 | 173 | 180 |
| 24M4DBP absorption number (ml/100 g) | 110 | 120 | 125 | 130 | 135 | 135 | 105 | 107 | 110 | 110 | 116 | 123 | 121 | 137 |
| CTAB adsorption specific surface area (m²/g) | 100 | 110 | 125 | 130 | 140 | 140 | 90 | 95 | 100 | 100 | 98 | 108 | 116 | 131 |
| Tire performance: Abrasion resistance (index) | 110 | 118 | 127 | 130 | 136 | 150 | 100 | 104 | 95 | 122 | 100 | 110 | 108 | 103 |
| Rolling resistance (index) | 97 | 101 | 100 | 108 | 112 | 100 | 93 | 95 | 90 | 103 | 100 | 110 | 109 | 116 |

It can be seen from the results shown in Table 3 that the tires prepared in Examples 1 and 8 in which the carbon blacks satisfying the production conditions and the physicochemical characteristics of carbon black regulated in the present invention were improved in both of a rolling resistance and an abrasion resistance to a large extent. Also, the tires prepared in Examples 2 to 6 and 10 stayed almost in the same level in a rolling resistance as the tires prepared in the comparative examples, but they were notably improved in an abrasion resistance as compared with the tires prepared in the comparative examples. Further, the tires prepared in Examples 7 and 9 were equivalent to or higher in an abrasion resistance than the tires prepared in the comparative examples and notably improved in a rolling resistance as compared with the tires prepared in the comparative examples.

INDUSTRIAL APPLICABILITY

The rubber compositions of the present invention are blended with carbon blacks which are obtained by the specific process and which have the specific properties, whereby pneumatic tires in which an abrasion resistance and a low heat generation property (low rolling resistance) are balanced at a high level can be provided.

What is claimed is:

1. A rubber composition containing carbon black for blending with rubber which is obtained in a reaction equipment continuously provided with a combustion gas-generating zone, a reaction zone and a reaction-stopping zone by producing a high temperature combustion gas in the combustion gas-generating zone, subsequently spraying and introducing a raw material into the reaction zone to form a reaction gas stream containing carbon black and then quenching the above reaction gas stream by a multistage quenching medium-introducing means in the reaction-stopping zone to terminate the reaction, wherein (1) the above carbon black for blending with rubber is obtained by controlling the following factors X, Y and Z so that the following relational equations (1), (2) and (3) are satisfied:

$$20 < X < 40 \quad (1)$$

$$50 < Y < 60 \quad (2)$$

$$90 < Z < 95 \quad (3)$$

(wherein X represents a toluene extract light transmittance (%) of the carbon black after introducing a first quenching medium from a raw material-introducing position, Y represents a toluene extract light transmittance (%) of the carbon black after introducing a second quenching medium, and Z represents a toluene extract light transmittance (%) of the carbon black after introducing a final quenching medium) and (2) the above carbon black for blending with rubber is contained in a proportion of 10 to 250 parts by mass based on 100 parts by mass of (A) a rubber component containing a conjugated diene based rubber, and wherein a hydrogen discharge rate of the carbon black for blending with rubber is higher than 0.30% by mass of the carbon black.

2. The rubber composition according to claim 1, wherein the carbon black for blending with rubber is obtained by controlling the following factors $\alpha1$, $\alpha2$ and $\beta$ so that the following relational equations (4), (5) and (6) are satisfied:

$$2.00 \leq \alpha1 \leq 5.00 \quad (4)$$

$$5.00 \leq \alpha2 \leq 9.00 \quad (5)$$

$$-2.5 \times (\alpha1+\alpha2)+85.0 \leq \beta \leq 90.0 \quad (6)$$

(wherein a retention time spent in the reaction zone until the first quenching medium is introduced since the raw material is sprayed and introduced into the reaction zone is $t_1$ (second) and that an average reaction temperature in the above zone is $T_1$ (° C.); a retention time spent in the zone until the second quenching medium is introduced since the first quenching medium is introduced is $t_2$ (second) and that an average reaction temperature in the above zone is $T_2$ (° C.); a retention time spent in the zone until the final quenching medium is introduced since the second quenching medium is introduced is $t_3$ (second) and that an average reaction temperature in the above zone is $T_3$ (° C.); $\alpha1$ is $t_1 \times T_1$; $\alpha2$ is $t_2 \times T_2$; and $\beta$ is $t_3 \times T_3$).

3. The rubber composition according to claim 1, wherein the carbon black for blending with rubber has a DBP absorption number of 95 to 220 ml/100 g, a 24M4 DBP absorption number of 90 to 200 ml/100 g and a CTAB adsorption specific surface area of 70 to 200 m$^2$/g.

4. A pneumatic tire prepared by using the rubber composition according to claim 1.

* * * * *